United States Patent
Bichkar et al.

(10) Patent No.: US 12,179,741 B2
(45) Date of Patent: Dec. 31, 2024

(54) ADAPTIVE CONTROLS OF ENGINE DISCONNECT CLUTCH

(71) Applicant: Ford Global Technologies, LLC, Dearborn, MI (US)

(72) Inventors: Akshay Bichkar, Ann Arbor, MI (US); Jason Meyer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 326 days.

(21) Appl. No.: 17/678,341

(22) Filed: Feb. 23, 2022

(65) Prior Publication Data

US 2023/0264681 A1    Aug. 24, 2023

(51) Int. Cl.
*B60W 20/40*    (2016.01)
*B60K 6/387*    (2007.10)
*B60W 10/02*    (2006.01)

(52) U.S. Cl.
CPC ............. *B60W 20/40* (2013.01); *B60K 6/387* (2013.01); *B60W 10/023* (2013.01); *B60W 2510/0291* (2013.01); *B60W 2710/083* (2013.01)

(58) Field of Classification Search
CPC ............... B60W 20/40; B60W 10/023; B60W 2510/0291; B60W 2710/083; B60W 10/02; B60W 10/06; B60W 10/08; B60W 50/0098; B60W 2050/004; B60W 2510/06; B60W 2510/0208; B60K 6/387; B60K 2006/4825; B60K 6/48; Y02T 10/62; F16D 2500/10412; F16D 2500/3067; F16D 2500/0217
See application file for complete search history.

(56) References Cited

U.S. PATENT DOCUMENTS

| | | | | |
|---|---|---|---|---|
| 4,558,772 A * | 12/1985 | Grimes | ................. | F16D 48/066 477/174 |
| 4,766,544 A * | 8/1988 | Kurihara | ............... | F16D 48/064 701/67 |
| 4,969,545 A * | 11/1990 | Hayashi | .................. | F16D 37/02 701/68 |
| 5,002,170 A * | 3/1991 | Parsons | ................. | B60W 10/10 477/79 |
| 5,082,096 A * | 1/1992 | Yamashita | ............ | F16D 48/066 701/68 |
| 5,678,674 A * | 10/1997 | Nehse | ..................... | F16D 48/06 192/103 R |
| 5,779,594 A * | 7/1998 | Minowa | .............. | F16H 61/0437 477/109 |
| 6,285,942 B1 * | 9/2001 | Steinmetz | ............. | F16H 61/061 701/67 |

(Continued)

FOREIGN PATENT DOCUMENTS

JP    2003205768 A    7/2003

*Primary Examiner* — Bhavesh V Amin

(74) *Attorney, Agent, or Firm* — Vincent Mastrogiacomo; Brooks Kushman P.C.

(57) ABSTRACT

A hybrid vehicle includes an engine, an electric machine, and a clutch configured to selectively couple the engine to the electric machine. A controller is programmed to command a torque to the electric machine based on a clutch model that includes a learned time constant previously selected using a family of candidate time constants based on a comparison of the family to measured pressure data of a previous engagement of the clutch.

20 Claims, 6 Drawing Sheets

(56) References Cited

U.S. PATENT DOCUMENTS

| | | | | |
|---|---|---|---|---|
| 6,292,732 B1* | 9/2001 | Steinmetz | G06F 7/00 | 701/67 |
| 6,325,744 B1* | 12/2001 | Streib | B60W 30/20 | 477/181 |
| 6,440,041 B1* | 8/2002 | Riedle | B60W 30/186 | 477/107 |
| 6,480,777 B1* | 11/2002 | Sato | F16H 61/061 | 701/61 |
| 6,503,165 B1* | 1/2003 | Kubo | F16H 61/061 | 477/143 |
| 6,514,166 B2* | 2/2003 | Yuasa | F16H 61/061 | 477/143 |
| 6,688,412 B2* | 2/2004 | Kima | B60K 17/356 | 180/65.6 |
| 6,736,755 B2* | 5/2004 | Kato | F16H 61/0021 | 477/92 |
| 6,751,542 B2* | 6/2004 | Ishii | F16H 61/30 | 701/56 |
| 6,779,540 B2* | 8/2004 | Ishii | F16H 61/0251 | 137/487.5 |
| 6,896,641 B2* | 5/2005 | Matsumura | B60W 20/30 | 903/945 |
| 6,961,646 B2* | 11/2005 | Soliman | F16H 61/061 | 701/67 |
| 7,066,862 B2* | 6/2006 | Bothe | F16H 61/688 | 701/52 |
| 7,285,071 B2* | 10/2007 | Nakajima | F16H 61/12 | 477/118 |
| 7,286,922 B1* | 10/2007 | Fischer | F16H 61/143 | 701/87 |
| 7,351,182 B2* | 4/2008 | Kobayashi | B60W 10/06 | 903/946 |
| 7,373,234 B1* | 5/2008 | Hwang | F16H 61/0251 | 701/68 |
| 7,608,011 B2* | 10/2009 | Grabowski | B60K 6/48 | 180/65.25 |
| 7,643,925 B2* | 1/2010 | Whitton | F16H 61/061 | 701/52 |
| 7,896,114 B2* | 3/2011 | Colvin | B60K 6/48 | 903/930 |
| 7,938,209 B2* | 5/2011 | Dilzer | B60W 10/02 | 180/65.28 |
| 7,979,184 B2* | 7/2011 | Dickinson | F16H 61/0251 | 701/55 |
| 8,066,620 B2* | 11/2011 | Sah | B60W 10/115 | 477/175 |
| 8,113,988 B2* | 2/2012 | Foster | B60K 6/547 | 477/906 |
| 8,150,555 B2* | 4/2012 | Hinami | G05D 16/2093 | 700/289 |
| 8,155,849 B2* | 4/2012 | Porzel | F16D 48/04 | 701/67 |
| 8,157,035 B2* | 4/2012 | Whitney | B60K 6/485 | 180/65.265 |
| 8,170,761 B2* | 5/2012 | Kraenzlein | F16K 37/0091 | 701/58 |
| 8,267,233 B2* | 9/2012 | Grethel | F16H 61/0031 | 192/85.61 |
| 8,364,385 B2* | 1/2013 | Buslepp | F02D 35/023 | 701/107 |
| 8,577,571 B2* | 11/2013 | Einfinger | F16D 48/066 | 701/67 |
| 8,616,355 B2* | 12/2013 | Ishikawa | F16H 61/0021 | 192/3.29 |
| 8,628,451 B2* | 1/2014 | Sah | B60K 6/365 | 180/65.265 |
| 8,725,374 B2* | 5/2014 | Hodrus | F16D 48/06 | 701/67 |
| 8,781,697 B2* | 7/2014 | Otanez | F16H 61/0251 | 701/59 |
| 8,942,902 B2* | 1/2015 | Moseler | B60K 6/48 | 192/30 R |
| 9,233,686 B2* | 1/2016 | Park | F16D 48/06 | |
| 9,242,645 B2* | 1/2016 | Kim | B60W 20/50 | |
| 9,278,688 B2* | 3/2016 | Kim | B60K 6/387 | |
| 9,388,866 B2* | 7/2016 | Chimner | F16D 48/02 | |
| 9,683,656 B2* | 6/2017 | Meyer | F16H 61/0213 | |
| 9,714,027 B2* | 7/2017 | Yamazaki | B60W 20/40 | |
| 9,738,270 B1* | 8/2017 | Chung | B60K 6/38 | |
| 9,789,867 B2* | 10/2017 | Kim | B60W 10/06 | |
| 9,810,273 B2* | 11/2017 | Nedorezov | B60W 20/40 | |
| 9,994,216 B2* | 6/2018 | Kim | B60W 50/029 | |
| 10,302,158 B2* | 5/2019 | Kim | F16D 25/0638 | |
| 10,350,983 B2* | 7/2019 | Imamura | B60W 10/08 | |
| 10,543,832 B2* | 1/2020 | Yamazaki | B60W 30/19 | |
| 10,913,448 B2* | 2/2021 | Blue | F16D 48/02 | |
| 10,948,034 B2* | 3/2021 | Nedorezov | B60K 6/387 | |
| 11,078,971 B2* | 8/2021 | Ko | F16D 25/082 | |
| 11,247,663 B2* | 2/2022 | Yamazaki | B60W 10/08 | |
| 11,441,622 B1* | 9/2022 | Ko | F16D 13/52 | |
| 11,518,365 B2* | 12/2022 | Saito | B60K 6/26 | |
| 11,628,817 B2* | 4/2023 | Roy | B60K 23/06 | 701/87 |
| 11,940,023 B2* | 3/2024 | Bichkar | F16D 48/066 | |
| 2001/0016539 A1* | 8/2001 | Yuasa | F16H 61/061 | 477/143 |
| 2002/0014958 A1* | 2/2002 | Inoue | F16D 48/066 | 340/425.5 |
| 2002/0029136 A1* | 3/2002 | Hagiwara | G01M 13/02 | 703/8 |
| 2002/0091034 A1* | 7/2002 | Nakamori | B60K 6/485 | 477/3 |
| 2003/0087726 A1* | 5/2003 | Mack | B60W 30/18 | 477/181 |
| 2006/0040791 A1* | 2/2006 | Nakajima | F16H 61/061 | 477/906 |
| 2007/0102211 A1* | 5/2007 | Nozaki | B60K 6/547 | 180/65.7 |
| 2007/0213174 A1* | 9/2007 | Tamai | F16H 61/0031 | 477/52 |
| 2007/0259755 A1* | 11/2007 | Tanishima | B60W 10/02 | 477/3 |
| 2007/0276557 A1* | 11/2007 | Motosugi | B60W 10/06 | 701/67 |
| 2008/0076623 A1* | 3/2008 | Tabata | B60W 10/115 | 477/5 |
| 2008/0176709 A1* | 7/2008 | Wu | B60W 20/50 | 477/143 |
| 2008/0194371 A1* | 8/2008 | Matsubara | F16H 59/68 | 701/88 |
| 2009/0018735 A1* | 1/2009 | Whitton | F16H 61/0204 | 477/109 |
| 2009/0062997 A1* | 3/2009 | Iwase | F16D 48/06 | 701/67 |
| 2009/0234524 A1* | 9/2009 | Kim | B60W 10/06 | 701/22 |
| 2010/0075798 A1* | 3/2010 | Suzuki | B60W 10/08 | 903/946 |
| 2010/0114443 A1* | 5/2010 | Terwart | F16H 61/688 | 701/68 |
| 2010/0204890 A1* | 8/2010 | Desfriches | B60W 10/182 | 701/36 |
| 2010/0273603 A1* | 10/2010 | Roses | B60W 30/19 | 903/909 |
| 2011/0125378 A1* | 5/2011 | Blessing | F16H 61/688 | 701/68 |
| 2011/0153134 A1* | 6/2011 | Rocq | F16D 48/06 | 180/65.265 |
| 2011/0190996 A1* | 8/2011 | Nedachi | F16H 61/16 | 701/67 |
| 2012/0024653 A1* | 2/2012 | Ergun | F16D 48/064 | 192/82 T |
| 2012/0055146 A1* | 3/2012 | Baraga | F16H 61/0031 | 60/327 |
| 2012/0065819 A1* | 3/2012 | Christman | B60W 10/08 | 180/65.285 |
| 2012/0083385 A1* | 4/2012 | Smith | B60W 20/00 | 180/65.265 |

(56) References Cited

U.S. PATENT DOCUMENTS

| | | | | |
|---|---|---|---|---|
| 2012/0103709 A1* | 5/2012 | Mochiyama | F16H 61/0025 | 180/65.21 |
| 2012/0232766 A1* | 9/2012 | Einfinger | F16D 48/066 | 701/67 |
| 2012/0232767 A1* | 9/2012 | MacMillian | F16D 48/06 | 701/67 |
| 2012/0244993 A1* | 9/2012 | Ishida | F16H 61/66259 | 477/39 |
| 2012/0298466 A1* | 11/2012 | Nedachi | F16D 48/06 | 192/84.6 |
| 2013/0150209 A1* | 6/2013 | Jeong | B60W 20/50 | 477/80 |
| 2013/0253791 A1* | 9/2013 | Hodrus | F16D 48/06 | 701/67 |
| 2013/0282217 A1* | 10/2013 | Oel | F16D 48/06 | 903/902 |
| 2013/0296108 A1* | 11/2013 | Ortmann | B60K 6/48 | 903/902 |
| 2013/0297105 A1* | 11/2013 | Yamazaki | B60W 10/02 | 903/902 |
| 2013/0297115 A1* | 11/2013 | Doering | B60W 20/40 | 180/65.265 |
| 2013/0310217 A1* | 11/2013 | Terakawa | F16D 48/066 | 903/902 |
| 2014/0041986 A1* | 2/2014 | Ruehle | F16H 63/3483 | 192/220.2 |
| 2014/0088805 A1* | 3/2014 | Tulpule | B60W 10/06 | 180/65.265 |
| 2014/0100082 A1* | 4/2014 | Gibson | F02N 19/005 | 477/181 |
| 2014/0172212 A1* | 6/2014 | Park | B60W 20/40 | 903/902 |
| 2014/0222270 A1* | 8/2014 | Tsutsumi | B60W 10/08 | 180/65.265 |
| 2014/0224054 A1* | 8/2014 | Thornton | F16D 48/06 | 74/473.11 |
| 2014/0229080 A1* | 8/2014 | Pietron | F16H 63/3026 | 701/51 |
| 2014/0336904 A1* | 11/2014 | Nakanishi | B60K 6/48 | 701/110 |
| 2015/0051767 A1* | 2/2015 | Mohri | B60L 50/66 | 180/65.265 |
| 2015/0080175 A1* | 3/2015 | Kobayashi | B60W 20/40 | 180/65.265 |
| 2015/0112529 A1* | 4/2015 | Kim | B60W 50/029 | 903/902 |
| 2015/0126329 A1* | 5/2015 | Johri | B60W 20/40 | 903/902 |
| 2015/0197252 A1* | 7/2015 | Tinker | B60W 10/06 | 477/54 |
| 2016/0032990 A1* | 2/2016 | Nedorezov | F16D 48/066 | 477/174 |
| 2016/0046282 A1* | 2/2016 | Yamazaki | B60W 20/40 | 180/65.265 |
| 2016/0090934 A1* | 3/2016 | Na | F02D 41/2464 | 701/103 |
| 2016/0107639 A1* | 4/2016 | Kim | B60W 50/029 | 903/902 |
| 2016/0193995 A1* | 7/2016 | Kim | B60W 10/06 | 180/65.265 |
| 2016/0195451 A1* | 7/2016 | Fujii | F16D 48/06 | 73/115.02 |
| 2016/0272192 A1* | 9/2016 | Ashizawa | B60W 20/40 | |
| 2016/0312884 A1* | 10/2016 | Meyer | F16H 59/14 | |
| 2016/0375893 A1* | 12/2016 | Nefcy | B60W 30/18127 | 180/65.265 |
| 2017/0274754 A1* | 9/2017 | Imamura | B60W 10/08 | |
| 2017/0305413 A1* | 10/2017 | Yamazaki | B60W 10/08 | |
| 2018/0050684 A1* | 2/2018 | Meyer | B60W 20/20 | |
| 2018/0099659 A1* | 4/2018 | Jeong | B60W 20/15 | |
| 2018/0119758 A1* | 5/2018 | Nedorezov | F16D 48/066 | |
| 2018/0208214 A1* | 7/2018 | Nakamura | F01M 1/20 | |
| 2018/0244169 A1* | 8/2018 | Meyer | B60L 15/2054 | |
| 2018/0244263 A1* | 8/2018 | Bower | B60W 10/113 | |
| 2018/0265087 A1* | 9/2018 | Tohta | F16H 63/50 | |
| 2018/0354493 A1* | 12/2018 | Johri | B60W 10/06 | |
| 2019/0176798 A1* | 6/2019 | Ford | B60K 6/387 | |
| 2020/0079353 A1* | 3/2020 | Yamazaki | B60W 30/19 | |
| 2020/0122713 A1* | 4/2020 | Blue | B60W 50/032 | |
| 2020/0256036 A1* | 8/2020 | Hodel | E02F 9/2253 | |
| 2020/0257607 A1* | 8/2020 | Hodel | E02F 9/2079 | |
| 2020/0309256 A1* | 10/2020 | Kim | B60W 10/113 | |
| 2021/0053553 A1* | 2/2021 | Akanda | B60W 20/11 | |
| 2021/0061258 A1* | 3/2021 | Saito | B60W 10/06 | |
| 2021/0354681 A1* | 11/2021 | Roy | F16H 63/50 | |
| 2022/0269834 A1* | 8/2022 | Yang | G06F 30/27 | |
| 2023/0182716 A1* | 6/2023 | Bichkar | B60K 6/26 | 701/22 |
| 2023/0264681 A1* | 8/2023 | Bichkar | B60K 6/48 | 701/5 |
| 2024/0068532 A1* | 2/2024 | Bichkar | F16D 48/066 | |

\* cited by examiner

ADAPTIVE CONTROLS OF ENGINE DISCONNECT CLUTCH

TECHNICAL FIELD

The present disclosure relates to wet clutches in hybrid vehicles and more specifically to controlling an engine disconnect clutch.

BACKGROUND

A hybrid-electric powertrain includes an engine and an electric machine. The torque and power produced by the engine and/or the electric machine can be transferred through a transmission to the driven wheels to propel the vehicle. A traction battery supplies energy to the electric machine. The hybrid powertrain is also capable of performing regenerative braking where the electric machine brakes the vehicle by converting mechanical power into electrical power to recharge the battery. A disconnect clutch may be used to selectively connect the engine and the electric machine.

SUMMARY

According to one embodiment, a hybrid vehicle includes an engine, an electric machine, and a clutch configured to selectively couple the engine to the electric machine. A vehicle controller is programmed to, responsive to an engine-start request, command a torque to the electric machine based on a clutch model that includes a learned time constant previously selected from a family of candidate time constants, each associated with a candidate clutch model, based on a comparison of the candidate clutch model to measured pressure data of a previous engagement of the clutch.

According to another embodiment, a hybrid vehicle includes an engine, an electric machine, and a clutch configured to selectively couple the engine to the electric machine. A controller is programmed to command a torque to the electric machine based on a clutch model that includes a learned time constant previously selected using a family of candidate time constants based on a comparison of the family to measured pressure data of a previous engagement of the clutch.

According to yet another embodiment, a method of controlling a disconnect clutch configured to selectively couple an engine and an electric machine includes commanding a torque to an electric machine based on a clutch model that includes a learned time constant previously selected using a family of candidate time constants, each associated with a candidate clutch model, based on a comparison of the candidate clutch models to measured pressure data of a previous engagement of the clutch.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
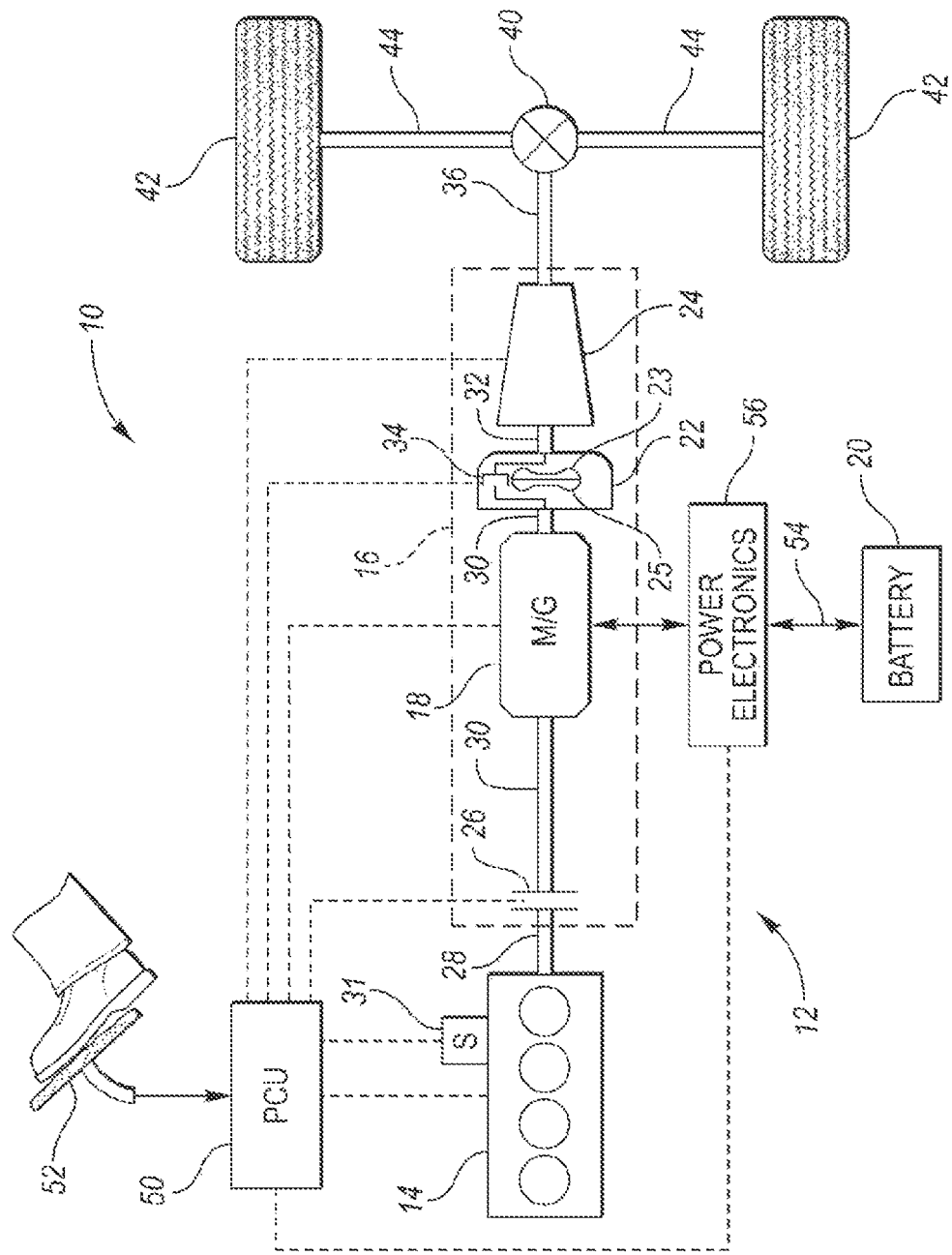
FIG. 1 is a schematic of a hybrid electric vehicle according to one embodiment.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, the transmission 16 includes an electric machine such as an electric motor/generator (M/G) 18, an associated traction battery 20, a torque converter 22, and a multiple step-ratio automatic transmission or gearbox 24. The engine 14, M/G 18, torque converter 22, and the automatic transmission 16 are connected sequentially in series, as illustrated in FIG. 1. For simplicity, the M/G 18 may be referred to as a motor.

The engine 14 and the M/G 18 are both drive sources for the HEV 10 and may be referred to as actuators. The engine 14 generally represents a power source that may include an internal-combustion engine such as a gasoline, diesel, or natural-gas powered engine. The engine 14 generates an engine power and corresponding engine torque that is supplied to the M/G 18 when a disconnect clutch 26 (sometimes called a K0 clutch) between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

The disconnect clutch 26 is a wet clutch that includes a clutch pack having a plurality of clutch discs and pressure plates. The clutch 26 may be hydraulically controlled by applying fluid pressure to a piston. The piston compresses the clutch pack, based on the fluid pressure, to transfer torque (also know as clutch torque capacity) across the clutch.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously, drivably connected to the shaft 30, whereas the engine 14 is drivably connected to the shaft 30 only when the disconnect clutch 26 is at least partially engaged. When the disconnect clutch 26 is locked (fully engaged), the crankshaft 28 is fixed to the shaft 30.

A separate starter motor 31 can be selectively engaged with the engine 14 to rotate the engine to allow combustion to begin. Once the engine is started, the starter motor 31 can be disengaged from the engine via, for example, a clutch (not shown) between the starter motor 31 and the engine 14. In one embodiment, the starter motor 31 is a belt-integrated starter generator (BISG). In one embodiment, the engine 14 is started by the starter motor 31 while the disconnect clutch 26 is open, keeping the engine disconnected with the M/G 18. Once the engine has started and is brought up to speed with the M/G 18, the disconnect clutch 26 can couple the engine 14 to the M/G 18 to allow the engine to provide drive torque.

The engine 14 may also be started by the M/G 18. In some embodiment, the vehicle may be programmed to start the engine 14 using the starter 31 in some situations and with the M/G 18 in others. Alternatively, the starter motor 31 may not be provided and the engine 14 is started by the M/G 18 in all situations. To do so, the disconnect clutch 26 partially engages to transfer torque from the M/G 18 to the engine 14. The M/G 18 may be required to ramp up in torque to fulfill driver demands while also starting the engine 14. The disconnect clutch 26 can then be fully engaged once the engine speed is brought up to the speed of the M/G.

The M/G 18 is connected to the torque converter 22 via shaft 30. The torque converter 22 is therefore connected to the engine 14 when the disconnect clutch 26 is at least partially engaged. The torque converter 22 includes an impeller 23 fixed to M/G shaft 30 and a turbine 23 fixed to a transmission input shaft 32. The torque converter 22 provides a hydraulic coupling between shaft 30 and transmission input shaft 32. The torque converter 22 transmits power from the impeller 23 to the turbine 25 when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and the launch clutch 34 (which may be a torque converter bypass clutch) is generally referred to as a downstream clutch.

The gearbox 24 may include gear sets, such as planetary gear sets, that are selectively placed in different gear ratios by selective engagement of friction elements such as clutches and brakes to establish the desired multiple discrete or step drive ratios. For simplicity, the gear ratios may be referred to as gears, i.e., first gear, second gear, etc. The friction elements are controllable through a shift schedule that connects and disconnects certain elements of the gear sets to control the speed and torque ratios between a transmission output shaft 36 and the transmission input shaft 32. The gearbox 24 may have six speeds including first through sixth gears. In this example, sixth gear may be referred to as top gear. First gear has the lowest speed ratio and the highest torque ratio between the input shaft 32 and the output shaft 36, and top gear has the highest speed ratio and the lowest torque ratio. The gearbox 24 is automatically shifted from one ratio to another based on various vehicle and ambient operating conditions by an associated controller, such as a powertrain control unit (PCU). The gearbox 24 then provides powertrain-output torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes one or more controller 50 such as a powertrain control unit (PCU), an engine control module (ECM), and a motor control unit (MCU). While illustrated as one controller, the controller 50 may be part of a larger control system and may be controlled by various other controllers throughout the vehicle 10, such as a vehicle system controller (VSC). It should therefore be understood that the controller 50 and one or more other controllers can collectively be referred to as a "controller" that controls various actuators in response to signals from various sensors to control functions such as starting/stopping, operating M/G 18 to provide wheel torque or charge battery 20, select or schedule transmission shifts, etc. Controller 50 may include a microprocessor or central processing unit (CPU) in communication with various types of computer-readable storage devices or media. Computer-readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the vehicle.

The controller communicates with various vehicle sensors and actuators via an input/output (I/O) interface that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic executed by the controller include fuel-injection timing, rate, and duration, throttle-valve position, spark plug ignition timing (for spark-ignition engines), intake/exhaust valve timing and duration, front-end accessory drive (FEAD) components such as an alternator, air conditioning compressor, battery charging, regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake-manifold pressure (MAP), accelerator-pedal position (PPS), ignition-switch position (IGN), throttle-valve position (TP), air temperature (TMP), exhaust gas oxygen (EGO) or other exhaust gas component concentration or presence, intake-air flow (MAF), transmission gear, ratio, or mode, transmission-oil temperature (TOT), transmission-turbine speed (TS), torque converter bypass clutch 34 status (TCC), slowing or shift mode (MDE), for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the pedal 52 generates an accelerator pedal position signal that may be interpreted by the controller 50 as a demand for increased power or decreased power, respectively. This may be referred to as driver-demanded torque. Based at least upon input from the pedal, the controller 50 commands torque from the engine 14 and/or the M/G 18. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. When the engine 14 alone provides the torque necessary to propel the vehicle, this operation mode may be referred to as the "engine mode," "engine-only mode," or "mechanical mode."

The M/G 18 may assist the engine 14 by providing additional power to turn the shaft 30. This operation mode may be referred to as a "hybrid mode," an "engine-motor mode," or an "electric-assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive torque (drive torque) or negative torque (regenerative braking) to the shaft 30. This operation mode may be referred to as an "electric only mode," "EV (electric vehicle) mode," or "motor mode."

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which rotational energy from spinning wheels 42 is transferred back through the gearbox 24 and is converted into electrical energy for storage in the battery 20. The M/G 18 may be referred to as providing negative torque when acting as a generator.

It should be understood that the schematic illustrated in FIG. 1 is merely exemplary and is not intended to be limiting. Other configurations are contemplated that utilize selective engagement of both an engine and a motor to transmit through the transmission. For example, the M/G 18 may be offset from the crankshaft 28, and/or the M/G 18 may be provided between the torque converter 22 and the gearbox 24. Other configurations are contemplated without deviating from the scope of the present disclosure.

A wet clutch, such as the disconnect clutch 26, may be controlled by a hydraulic actuator such as a hydraulic piston. For example, the disconnect connect clutch 26 may include a housing that supports a plurality of separator plates that are rotationally fixed to the housing and a plurality of friction plates that are interleaved with the separator plates. The friction plates are rotatable relative to the housing. The collection of separator plates and friction plates may be referred to as a clutch pack. The housing is rotationally fixed to the engine or the M/G and the friction plates are rotationally fixed to the other of the engine and the M/G. In one example embodiment, the housing is rotationally fixed relative to the crankshaft of the engine and the friction plates are fixed relative to the rotor shaft of the M/G. This is just an example, and any type of disconnect clutch may be used. The clutch 26 is engaged and disengaged by flowing pressurized fluid to a hydraulic piston. The piston includes a portion that contacts the clutch pack. Movement of the piston towards the clutch pack (referred to as stroke) frictionally engages the separator plates and the friction plates to engage the clutch 26. Movement of the piston away from the clutch pack (referred to as de-stroke) disengages the clutch 26. The piston includes an associated apply chamber that is in fluid communication with a fluid source. Flowing pressured fluid into the chamber strokes the piston. Depressurizing fluid in the chamber allows a return spring (or the like) to de-stroke the piston.

The torque capacity of a wet clutch is controlled by commanding fluid to the associated piston to increase and decrease pressure applied to the clutch plates and discs. A mathematical relationship between pressure of the hydraulic actuator and the torque capacity of the wet clutch may be referred to as a clutch-transfer function. The clutch-transfer function is a model of expected clutch torque capacity for a given pressure. Such a transfer function may be utilized to control the clutch torque.

Figure 2:
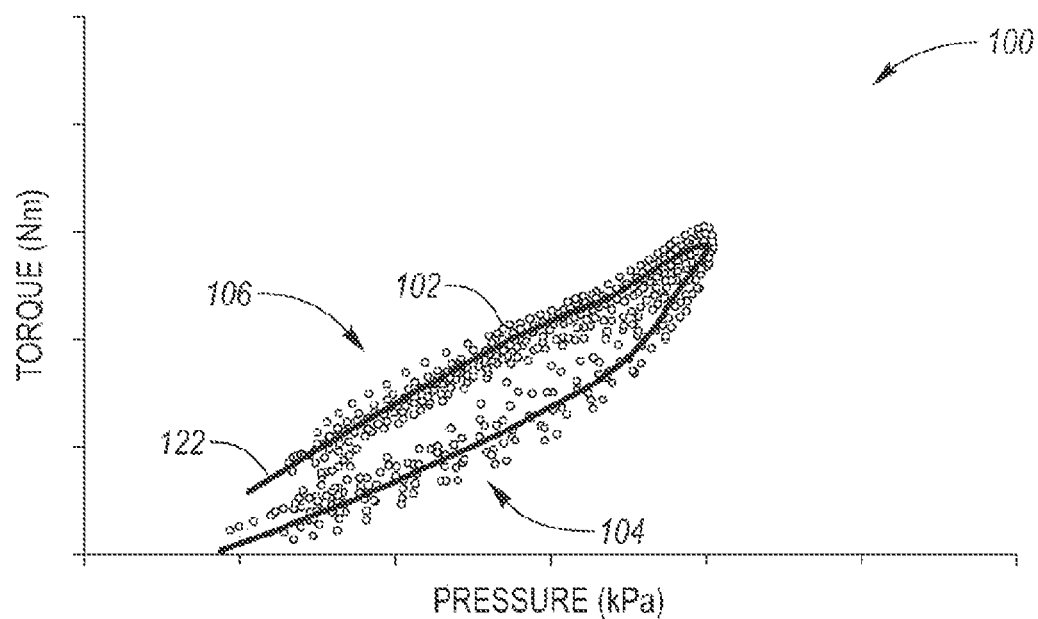
FIG. 2 is a plot showing of test data for a clutch and a torque transfer function according to one or more embodiments.

The clutch torque transfer function specifies the relationship between clutch torque and clutch actuator pressure. The clutch-transfer function may be obtained by fitting a mathematical function to test data. FIG. 2 is a plot 100 of test data for a wet clutch, such as an engine disconnect clutch. As shown by the data points 102, the clutch torque varies for a same commanded pressure. This is known as clutch torque variation or clutch torque variation specification. The variation is somewhat grouped with a lower grouping of data points 104 and an upper grouping 106. The lower grouping 104 represents the data collected during the engagement of the clutch while the upper grouping 106 represents the data collected during the disengagement of the clutch. The variation of the clutch torque is dependent upon the design of the clutch and some clutches have tighter variations than others. The variation of the clutch torque also depends on hydraulic pressure profiles and operating conditions such as temperature. The vehicle controller can use the clutch-transfer function to determine a pressure command based on a request clutch torque capacity, for example.

Figure 3:
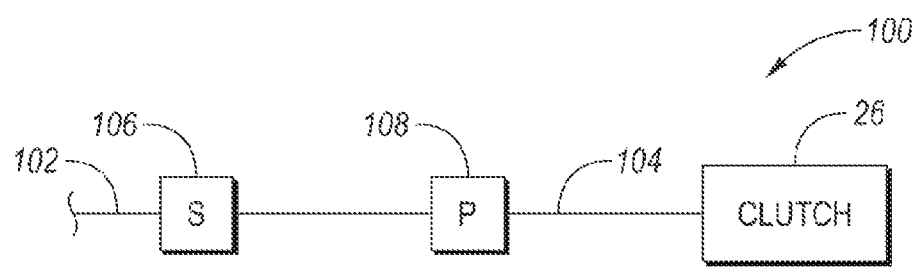
FIG. 3 is a schematic diagram of a hydraulic system associated with a disconnect clutch of the hybrid electric vehicle.

Referring to FIG. 3, a hydraulic clutch, such as the disconnect clutch 26, may be controlled by a hydraulic system 100 that operates the piston to control clutch torque capacity. The hydraulic system 100 is configured to deliver pressured fluid (oil) to the piston apply chamber. The system 100 may be a branch of the hydraulic system of the transmission. The system 100 includes one or more lines, hoses, etc. that connect between the clutch 26 and a fluid source, e.g., a valve body. Fluid within the line 102 is pressurized by a pump or other device and may be at line pressure. In the simplified example, the line 102 connects to a solenoid 106, e.g., an electrohydraulic valve, or other device capable of controlling an outlet pressure, flow rate, velocity, etc. to line 104. The line 104 connects the clutch 26 to the solenoid 106. During operation of the clutch 26, the solenoid 106 is controlled to vary the fluid pressure, flow rate, etc. sent to the piston chamber to achieve a desired clutch torque capacity. A pressure sensor 108 is configured to sense a measured pressure of the fluid within line 104. The measured pressure at sensor 108 may be used to represent the measured pressure of the clutch 26 in one or more models. The pressure sensor 108 is in electric communication with the controller and is configured to output data indicative of the measured pressure in line 104. The pressure sensor 108 is upstream of the piston chamber; therefore, a pressure difference may exist between the measured pressure at the sensor 108 and the pressure inside the piston chamber. The vehicle may use modeling to infer the piston apply chamber pressure (or piston pressure) based on the measured pressure from sensor 108. This inferred pressure is sometimes still referred to as a measured pressure as it is based on readings from a pressure sensor.

During the engine start and connection process, the clutch torque capacity is controlled to crank and/or connect the engine with a heavily modulated pressure and capacity profile. Accurate and precise clutch capacity delivery and estimation for the disconnect clutch 26 and M/G 18 coordination is needed to meet drivability and responsiveness requirements (e.g., smooth and fast).

Due to communication delay in distributed system (e.g., CAN delay) and clutch and motor actuator response delay, it may be desired to have a leading prediction signal of the anticipated clutch torque to compensate for the delay. A proficient leading signal helps ensure that delivered clutch response matches the modeled clutch response (e.g., 1" order model). Part variability and change over time can cause errors in clutch torque delivery, which is difficult to compensate for in open-loop and closed-loop clutch control during initial engine cranking. As such, this disclosure proposed an adaptive model to account for changes over time.

In order to deal with these complications, the controller generates a torque lead value that accounts for signal lag, torque application lag, and imperfections in sensor signals due to sensor placement. The controller may generate the torque lead value based on two methods. The first method may generate a first torque lead value, and the second method may generate a second torque lead value. The controller may generate a total or final torque lead value by combining the first torque lead value and the second torque lead value. Respective weighting factors can be applied to the first and second torque lead values prior to combining them to generate the total torque lead value.

After the controller has generated the torque lead value, the controller may provide the torque lead value to one or more other controllers or modules. The one or more controllers then causes the motor to generate an additional amount of torque based on the torque lead value and supplies the additional amount of torque to the disconnect clutch during the transition. The torque lead value based on the first and second methods results in a smooth transition. In other words, the additional amount of torque generated by the motor results in little or no acceleration or slowing down of the vehicle during the transition because the additional amount of torque is an accurate estimation of the amount of torque that should be generated by the motor during the transition.

In one embodiment, the controller generates the torque lead value by combining first and second torque lead values. In this case, the controller can apply sensor signals from sensors associated with the clutch 26 to the controller. The controller can then generate the torque lead value and control the M/G 18 in accordance with the torque lead value. The sensors associated with the disconnect clutch 26 may be directly coupled to the controller in some embodiments. Various arrangements of control modules and communication connections can be utilized without departing from the scope of the present disclosure.

The pressure at the head of the piston is the factor that causes the piston to move, thereby causing the clutch 26 to engage. However, the pressure sensor 108 is not located at the head of the piston. The controller can estimate the pressure at the piston based on the flow rate Q of the fluid within the fluid line 104. The flow rate Q can be calculated or estimated based on the following formula:

$$Q=(1/Kvs)*(Pv-Ps)$$

where Kvs is a constant corresponding to a pressure resistance between the solenoid 106 and the pressure sensor 108, Pv is the command pressure at the solenoid 106, and Ps is the pressure at the pressure sensor 108. The pressure Pp at the piston can be estimated from the flow rate Q based on the following relation:

$$Pp=Ps-Ksp*Q,$$

where Ps is the pressure at the location of the pressure sensor, and Ksp is a constant corresponding to a pressure resistance between the pressure sensor 108 and the piston. Plugging the formula for Q into the equation above provides the following formula for the piston pressure:

$$Pp=Ps-(Ksp/Kvs)*(Pv-Ps).$$

The first torque lead value (Tl1) can be calculated utilizing a first method based on the estimated piston pressure Pp, which is in turn based on the estimated flow rate Q. In particular, the first torque lead value Tl1 can be calculated by the following relationship:

$$Tl1=Tp*(\tau c*s+1)/((\tau c-\tau l)*s+1),$$

where Tp is the torque at the piston, $\tau c$ is a known time delay (or time constant) between the torque requested by the controller and the torque appearing at the clutch, and $\tau l$ is a selected lead time constant corresponding to the delay of the motor in generating torque commanded by the controller. $\tau l$ is generally less than $\tau c$. As described previously Tp can be estimated from Pp. In one embodiment, Tl1 can be generated by first generating a first pressure signal by substituting Pp for Tp in the relationship above. Tl1 can then be generated by converting Pl1 to Tl1 based on the known relationship between pressure and torque described above.

In an embodiment in which the first pressure lead value Pl1 is generated in place of or before generating a first torque lead value Tl1, the first pressure lead value Pl1 can be generated with the following formula:

$$Pl1=Pp*(\tau c*s+1)/((\tau c-\tau l)*s+1).$$

The controller may generate a second torque lead value (Tl2) by a second method. The second method assumes that the disconnect clutch response is a first-order system based on the command pressure Pv at the valve 120, or the corresponding command torque Tv at the solenoid 106. The second torque value is given by the following relationship:

$$Tl2=Tv/((\tau c-\tau l)*s+1).$$

In an embodiment in which a second pressure lead value Pl2 is generated in place of or before generating a second torque lead value Tl2, the second pressure lead value Pl2 can be generated by the second method with the following formula:

$$Pl2=Pv/((\tau c-\tau l)*s+1).$$

The total torque lead value Tl is generated by combining the first torque lead value and the second torque and signal. As will be understood better with relation to FIGS. 4A-4C, the combination of the first and second torque lead values results in a total torque lead value Tl that accurately matches the actual torque, with a selected leadtime $\tau l$. The total torque lead value Tl may be generated by applying weighting values to the first and second torque lead values before combining the first and second torque lead values. The total torque lead value Tl can be given by the following relationship, where w is a weighting value between 0 and 1:

$$Tl=w*Tl2+(1-w)*Tl1$$

Figure 4A:
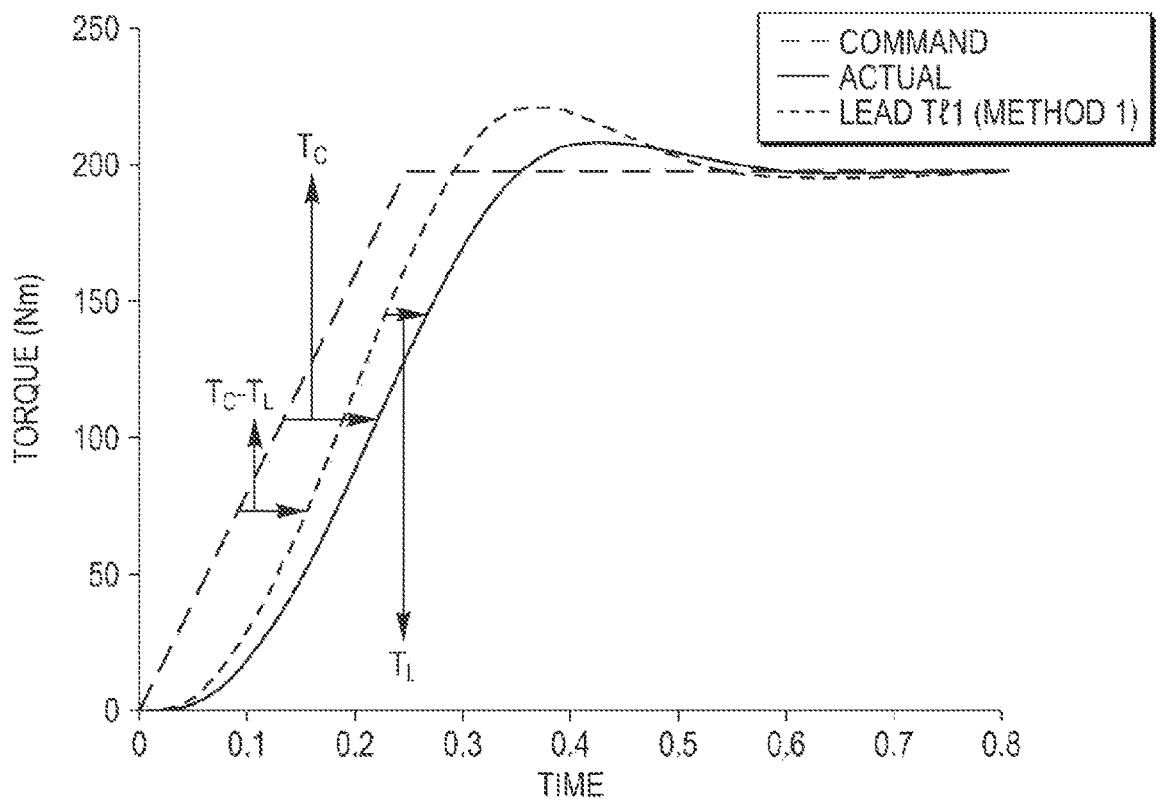
FIGS. 4A-4C are graphs of various torque signals associated with a hybrid vehicle according to one or more embodiments.

FIG. 4A is a graph illustrating various torque values versus time, according to one embodiment. The graph of FIG. 4A illustrates a commanded torque, an actual torque, and a first torque lead value Tl1. The commanded torque is the desired torque at the clutch 26 during a transition from a motor only mode of operation to a hybrid mode of operation that includes both the motor and the engine. The actual torque is the value of the torque capacity at the clutch 26 after the commanded pressure is applied. The first torque lead value Tl1 is a torque lead value generated by the controller using the first method.

As can be seen from FIG. 4A, when a torque is output by the clutch 26, there is a delay $\tau c$ between the request of the torque by the controller and the torque appearing at clutch 26. In the example of FIG. 4A the delay $\tau c$ is about 100 ms, though other values of the delay are possible based on the particular designs of the clutch and other factors. Furthermore, the actual torque that appears at the piston does not exactly mirror the command torque after the delay $\tau c$. The actual torque has a peak that exceeds the peak of the command torque before settling to the value of the command torque.

The first torque lead value Tl1 is generated with the selected lead time $\tau l$. The first torque lead value Tl1 leads the actual torque by the selected lead time $\tau l$. The selected lead time $\tau l$ is less than the delay $\tau c$. The selected lead time $\tau l$ corresponds to the motor delay in torque. Accordingly, if the M/G is commanded a time $\tau l$ before the actual torque of the clutch 26, then the torque delivered from the motor will be aligned in time with the actual clutch torque. In one example, the selected lead time τl is about 40 ms, though other values can be selected without departing from the scope of the present disclosure.

The first torque lead value Tl1 has a peak that exceeds the peak of the actual torque. This is because the first method that generates the first torque lead value Tl1 is an imperfect estimation of the actual torque with the selected lead time τl. The selected lead time τl is a parameter that can be selected/programmed by design engineers or that can be selected by the various control modules of the vehicle based on the delay of the M/G in producing torque.

Figure 4B:
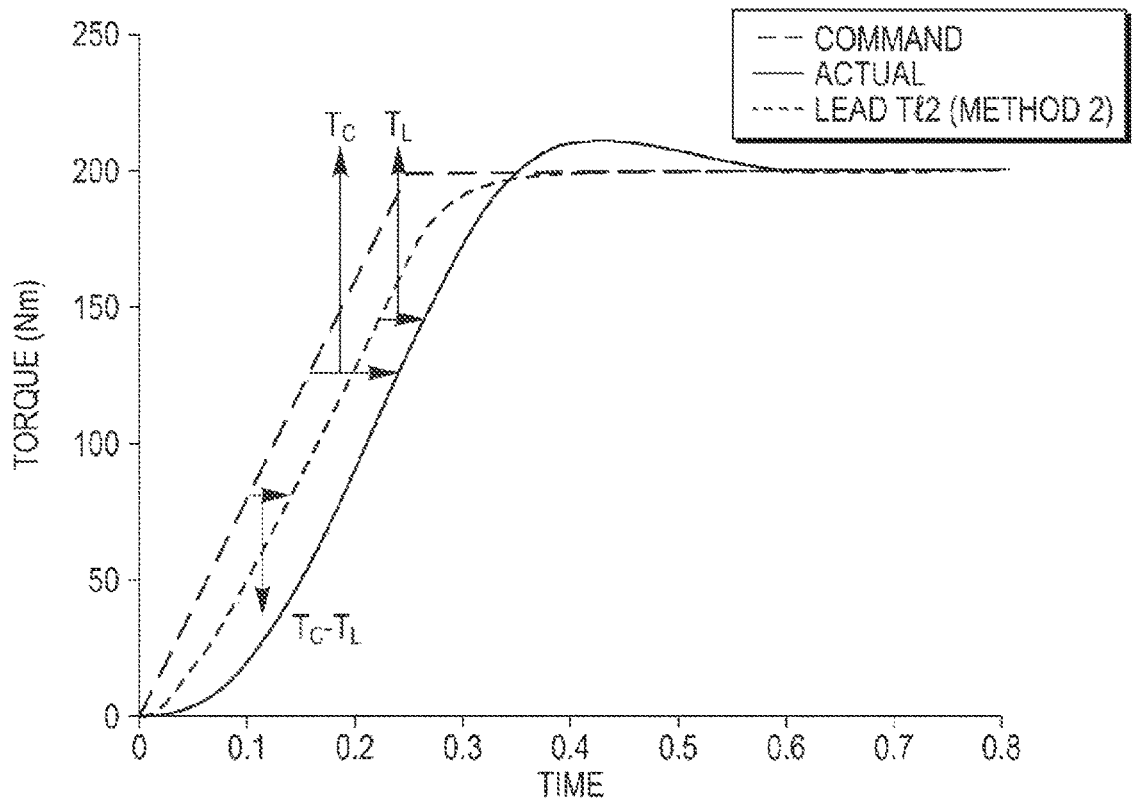

FIG. 4B is a graph illustrating various torque values versus time, according to one embodiment. The graph of FIG. 4B illustrates the command torque, the actual torque, and a second torque lead value Tl2. The second torque lead value Tl2 is a torque lead value generated by the controller using the second method.

The second torque lead value Tl2 is generated with the selected lead time τl. The second torque lead value Tl2 leads the actual torque by the selected lead time τl. The second torque lead value Tl2 has a peak that is lower than the peak of the actual torque. This is because the second method that generates the second torque lead value Tl2 is an imperfect estimation of the actual torque with the selected lead time τl. Thus, from FIGS. 4A and 4B, we can see that the first torque lead value Tl1 overshoots the actual torque while the second torque lead value Tl2 undershoots the actual torque.

Figure 4C:
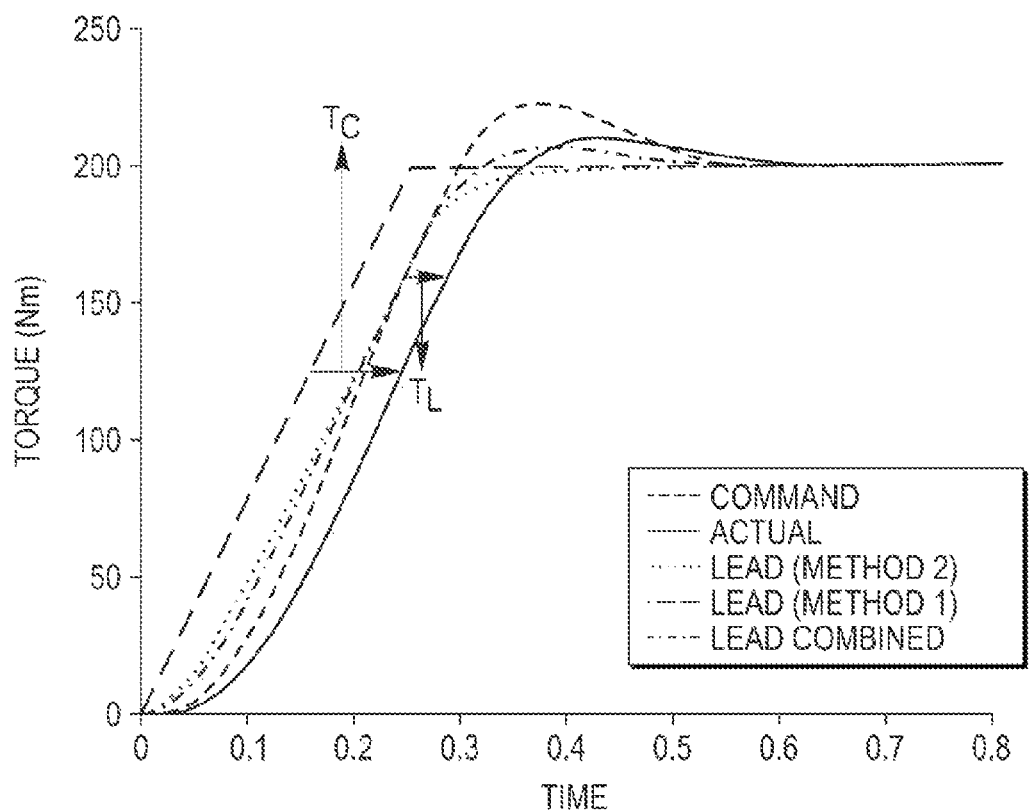

FIG. 4C is a graph illustrating various torque values versus time, according to one embodiment. The graph of FIG. 3C illustrates the command torque, the actual torque, the first torque lead value Tl1, the second torque lead value Tl2, and the total torque lead value Tl corresponding to a combination of the first and second torque lead values. As the first torque lead value Tl1 overshoots the actual torque and the second torque lead value Tl2 undershoots the actual torque, the combination of the first and second torque lead values results in a total torque lead value Tl that more closely matches the actual torque, but with the selected lead time τl.

The vehicle can utilize the torque lead value Tl to control the torque generated by the M/G 18 during transitions between operational modes. The torque lead value can be utilized to generate, with the motor, a torque that will result in a smooth transition between operational modes of the vehicle.

As set forth previously, the first and second torque lead values may be multiplied by respective weighting values. In one embodiment, the weighting values can be dynamically adjusted throughout the transition. In other words, the weighting values can be time-varying weighting values. In this case, the torque lead value Tl can be represented by the following formula, where w(t) is a time varying weighting value:

$$Tl = w(t) \cdot Tl2 + (1-w(t)) \cdot Tl1,$$

The value of the time varying weighting factor w(t) can be generated or selected based on the state of the clutch 26. For example, the time varying weighting factor w(t) can vary based on the current stage of the transition. Different weighting values can be used for the beginning of the transition, the middle of the transition, and the end of the transition. The weighting value w(t) can have a first value while the clutch 26 is starting up, a second value while the engine is starting up, and a third value while the clutch is locking. Various values for the weighting value w(t) can be utilized for various stages of the transition without departing from the scope of the present disclosure.

In one embodiment, the torque lead signal can be calculated in the following manner:

$$T_l = T_{l1} + (1-w(t)) \cdot T_{cor}$$

where Tcor is a torque correction value. The torque correction value can be calculated in the following manner:

$$Tcor = Tm - Tinst$$

where Tinst is the expected torque based on the most recent previous value of the torque lead signal Tl. In this example, the torque lead signal is based on the first torque lead signal Tl1, the time varying weighting value w(t), and the torque correction value Tcor.

Rather than using a static clutch model, the controller may adapt one or more parameters of the model, such as the time constant. For example, the controller may generate a family of candidate clutch models, each having different time constants, and compare the family to the measured pressure data of a previous engagement of the clutch. The controller may then select the candidate clutch model that best fits the measured-data curve, such as by comparing slopes of the curves. The time constant of the selected candidate model then replaces the previous time constant of the model so that the clutch model remains accurate over the life of the vehicle through this adaptation.

Figure 5:
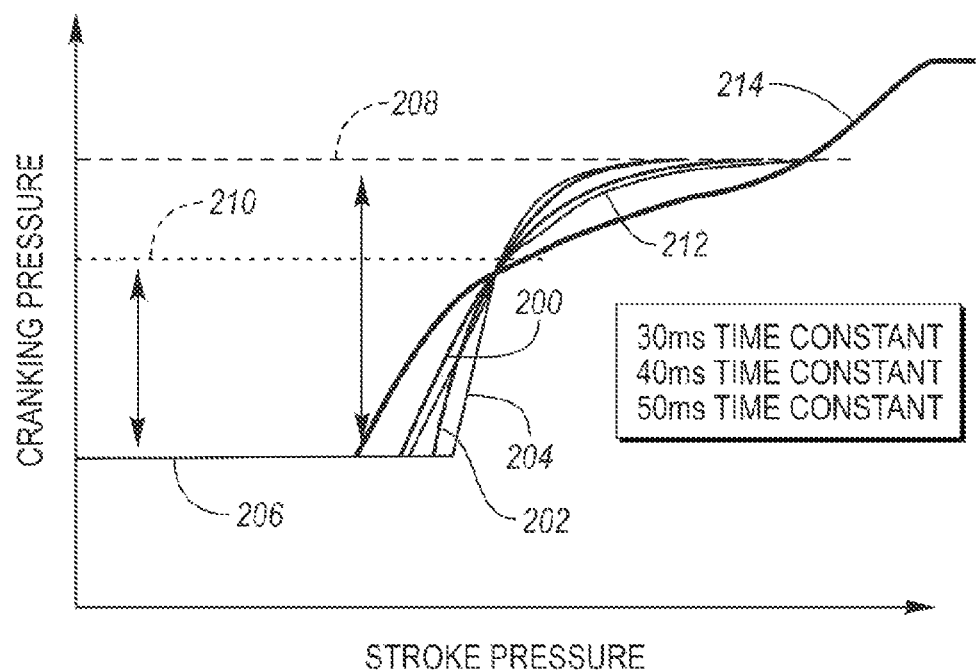
FIG. 5 illustrate measured pressure data compared with candidate clutch models associated with the disconnect clutch.

FIG. 5 illustrates an example family of computer-generated candidate clutch models. Shown are three different curves 200, 202, and 204. Each of the curves have a different time constant. In the illustrated example, the curve 200 has a time constant of 50 ms, the curve 202 has a time constant of 40 ms, and the curve 204 has a time constant of 30 ms. As can be seen, the steepness of the curve (the slope) increases as the time constant decreases and vice versa. The pressures of the curves rise from a stroke pressure illustrated by trace 206 to a cranking pressure 208. The curve 204, with the lowest time constant, reaches the cranking pressure 208 the fastest and trace 200, with the highest time constant, reaches the cranking pressure 208 the slowest. In order to accurately compare the family of curves, the curves are shifted in time to a common place. In the example illustrated embodiment, each curve 200, 202, 200 is time shifted to be placed at 63% of pressure rise (trace 210). The measured pressure is shown by trace 212. In this example, the curve 200 best matches the measured data 212 and thus is chosen by the controller. The controller may then update the model with the time constant of 50 ms, which corresponds to curve 200.

One or more of the computer-generated curves may be unsuitable and discarded. For example, any generated curves that produce a cranking pressure exceeding that of the measured pressure by a predetermined amount, e.g., a percentage, are unsuitable and discarded. Curve 214 is an example of an undesirable computer-generated curve that is discarded when generating the family curves. As shown, the curve 214 has a cranking pressure vastly exceeding that of the measured data 212.

Control logic or functions performed by controller 100 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 100. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

Figure 6:
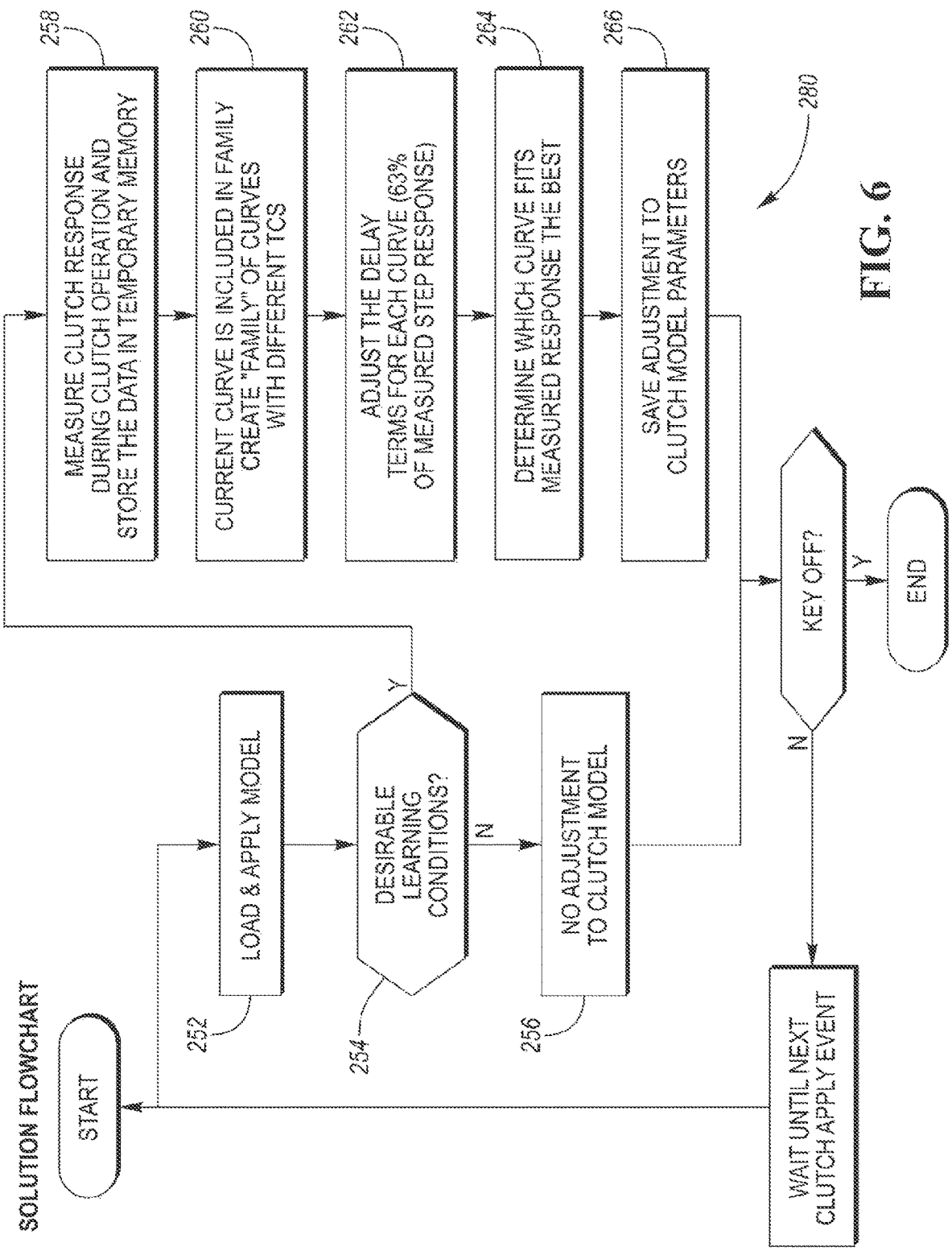
FIG. 6 is a flowchart of an algorithm for adapting a clutch model.

FIG. 6 is a flowchart 250 of an algorithm for adaptively updating a model of the disconnect clutch. For example, the flowchart 250 is used to determine an updated value for the time constant. At operation 252, which may occur following KEY ON, the controller loads and applies the clutch pressure model associated with the disconnect clutch. At operation 254, the controller determines if desirable learning conditions present. For example, the clutch model may only be updated when signal noise, fluid temperature, input shaft speed, line pressure, and other parameters are within desired thresholds or envelopes. If one or more these parameters are outside of their thresholds, no adjustment is made to the model at operation 256 and control loops back to start.

On the other hand, if desirable learning conditions are present, control passes to operation 258. In operation 258, the controller measures the clutch response during operation of the clutch and stores the measured data in temporary memory or the like. For example, the controller may measure the pressure of the clutch during engagement or disengagement, e.g., during engine start. The controller may measure the pressure of the clutch using sensor 108 and then using the above-described techniques estimate the actual pressure at the piston. The controller may measure the pressure at one or more predetermined intervals to create a series of data points over time. These data points may be fitted with a curve that shows the measured pressure response during the clutch operation.

Subsequent to the clutch operation, the controller may create a family of curves with different time constants using the commanded step response at operation 260. Each of the curves represents a possible or candidate pressure model of the clutch (clutch model). The curves may be computer-generated by changing the time constants, which creates different shaped curves. The controller may discard any curves that are unsuitable, such as having an amplitude that exceeds that of the measured data.

At operation 262, the controller adjusts the delay terms for each curve such that they are anchored to the first order time constant of the pressure rise point, e.g., 63% of measured step response. This provides a common reference point for comparing candidate curves. At operation 264, the controller determines which curve best fits the measured response. That is, the controller picks the time constant delay pair with the best fit. The controller may use least square or compare weighted errors at different points to determine the best fit. Alternatively, if a single best fit candidate curve cannot be determined, then the controller interpolates between the closest curves to determine an interpolated best fit candidate curve. The controller may compare the slopes of the candidate curves to the slope of the measured curve to determine the best fit. Once the controller determines the best of the candidate curves, the controller saves the adjustment to the clutch model parameters, e.g., time constant, relative to the current operating conditions for future use at operation 266.

The controller may perform this operation subsequent to each engagement of the clutch as shown in FIG. 6 or may limit adaption of the model to only occur at certain time intervals or cycles of the clutch.

Figure 7:
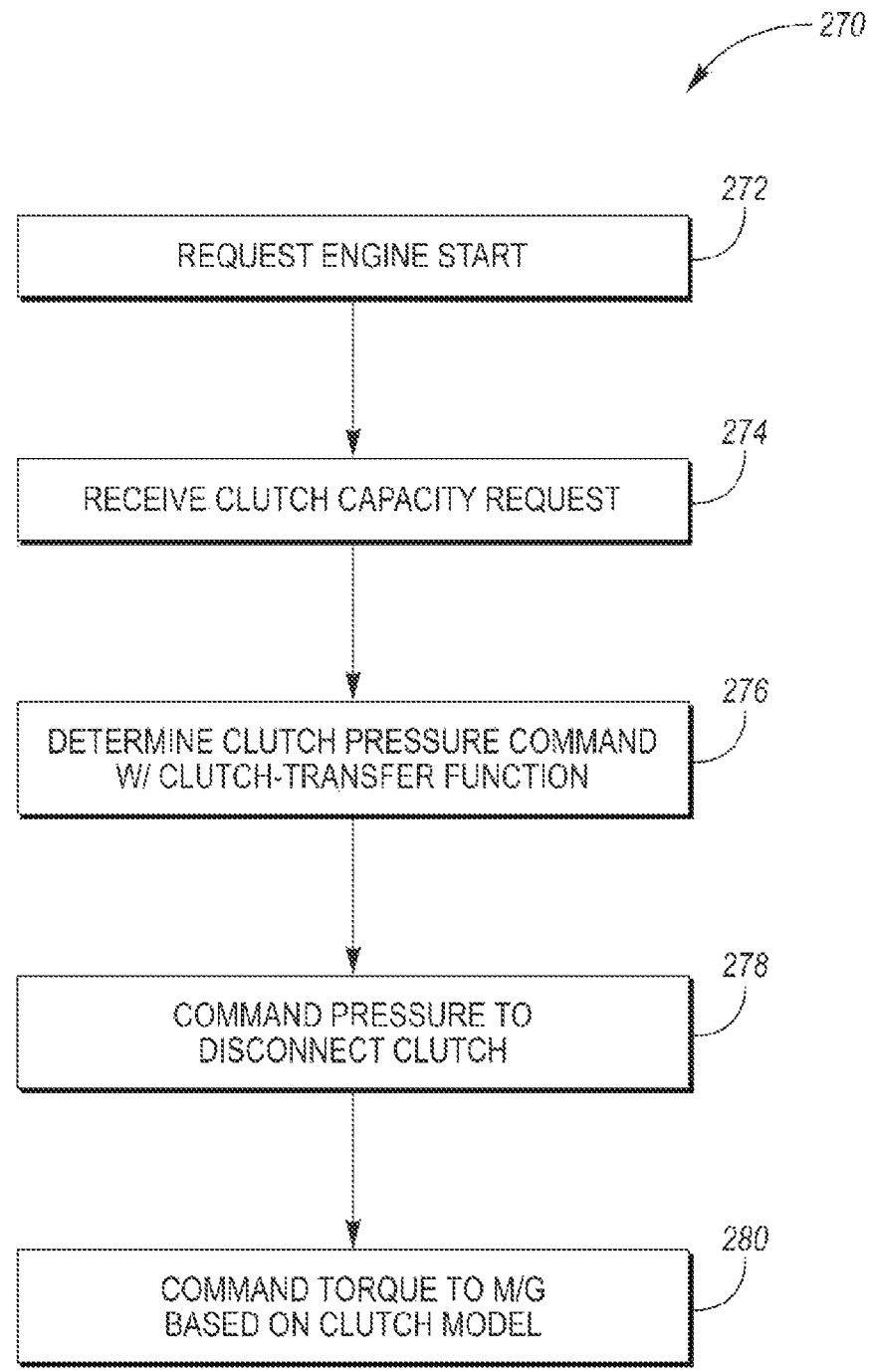
FIG. 7 is a flowchart of an algorithm for controlling the disconnect clutch and the M/G during an engine start.

FIG. 7 shows utilization of the adaptation controls (FIG. 6) during an engine start. Control starts at operation 272 responsive to a request to start the engine. At operation 274, one or more controllers receives a clutch capacity request for the disconnect clutch. The controller then determines a pressure command for the disconnect clutch using the clutch transfer function. The controller then commands the pressure to the disconnect clutch, e.g., to the solenoid, at operation 278. Operation 278 thus begins engagement of the clutch and the connection of the engine to the electric machine. To ensure a smooth and fast connection between the engine and the M/G, torque is commanded to the M/G to speed match with the engine at operation 280. As described above, torque is commanded to the M/G based on the clutch model. For example, the above-described third torque lead value (computed by combining the first torque lead value and the second lead torque value) may be used to command torque to the M/G during engine start. Since the clutch model is adapted, the torque commanded at operation 280 is ensured accurate leading to quality engine starts and other engagements of the disconnect clutch 26.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A hybrid vehicle comprising:
   an engine;
   an electric machine;
   a clutch configured to selectively couple the engine to the electric machine; and
   a controller programmed to, responsive to an engine-start request, command a torque to the electric machine based on a clutch model that includes a learned time constant previously selected from a family of candidate time constants, each associated with a candidate clutch model, based on a comparison of the candidate clutch model to measured pressure data of a previous engagement of the clutch.

2. The hybrid vehicle of claim 1, wherein the candidate clutch model associated with the previously selected learned time constant has a slope nearer to a slope of the measured pressure data than non-selected ones of the candidate clutch models.

3. The hybrid vehicle of claim 1, wherein amplitudes of the candidate clutch models do not exceed a maximum value of the measured pressure data by a predetermined amount.

4. The hybrid vehicle of claim 3, wherein the predetermined amount is a predetermined percentage.

5. A hybrid vehicle comprising:
an engine;
an electric machine;
a clutch configured to selectively couple the engine to the electric machine;
a pressure sensor associated with the clutch and configured to output the measured pressure data to the controller; and
a controller programmed to, responsive to an engine-start request, command a torque to the electric machine based on a clutch model that includes a learned time constant previously selected from a family of candidate time constants, each associated with a candidate clutch model, based on a comparison of the candidate clutch model to measured pressure data of a previous engagement of the clutch.

6. The hybrid vehicle of claim 1, wherein the controller is further programmed to discard the learned time constant responsive to a fluid temperature associated with the clutch being outside a threshold.

7. The hybrid vehicle of claim 1, wherein the family of candidate time constants includes at least two candidate time constants.

8. The hybrid vehicle of claim 1, wherein the comparison includes comparing slopes of the candidate clutch models to a slope of the measured pressure data.

9. The hybrid vehicle of claim 8, wherein the controller is further programmed to:
select the one of the candidate clutch models having the slope nearest to the slope of the measured pressure data; and
select the candidate time constant of the one of the candidate clutch models as the learned time constant.

10. A hybrid vehicle comprising:
an engine;
an electric machine;
a clutch configured to selectively couple the engine to the electric machine; and
a controller programmed to command a torque to the electric machine based on a clutch model that includes a learned time constant previously selected using a family of candidate time constants based on a comparison of the family to measured pressure data of a previous engagement of the clutch.

11. The hybrid vehicle of claim 10, wherein the comparison includes comparing the candidate time constants to a slope of the measured pressure data.

12. The hybrid vehicle of claim 10, wherein the controller is further programmed to select the one of the candidate time constants nearest to the slope of the measured pressure data.

13. The hybrid vehicle of claim 10, wherein the controller is further programmed to select a value for the learned time constant by interpolation between one or more of the candidate time constants nearest to the slope of the measured pressure data.

14. The hybrid vehicle of claim 10 further comprising a pressure sensor associated with the clutch and configured to output the measured pressure data to the controller, wherein the pressure sensor is in fluid communication with the clutch.

15. The hybrid vehicle of claim 10, wherein the controller is further programmed to discard the learned time constant responsive to a fluid temperature associated with the clutch being outside a threshold.

16. The hybrid vehicle of claim 10, wherein the controller is further programmed to discard the learned time constant responsive to a line pressure associated with the clutch being outside a threshold.

17. The hybrid vehicle of claim 5, wherein the candidate clutch model associated with the previously selected learned time constant has a slope nearer to a slope of the measured pressure data than non-selected ones of the candidate clutch models.

18. The hybrid vehicle of claim 5, wherein amplitudes of the candidate clutch models do not exceed a maximum value of the measured pressure data by a predetermined amount.

19. The hybrid vehicle of claim 18, wherein the predetermined amount is a predetermined percentage.

20. The hybrid vehicle of claim 5, wherein the controller is further programmed to:
select the one of the candidate clutch models having the slope nearest to the slope of the measured pressure data; and
select the candidate time constant of the one of the candidate clutch models as the learned time constant.

* * * * *